(12) United States Patent
Lee (10) Patent No.: US 7,130,132 B2
(45) Date of Patent: Oct. 31, 2006

(54) ZOOM LENS BARREL

(75) Inventor: Sang-geol Lee, Seongnam-si (KR)

(73) Assignee: Samsung Techwin Co., Ltd., Changwon-city (KR)

( * ) Notice: Subject to any disclaimer, the term of this patent is extended or adjusted under 35 U.S.C. 154(b) by 71 days.

(21) Appl. No.: 11/004,416

(22) Filed: Dec. 3, 2004

(65) Prior Publication Data

US 2005/0185298 A1    Aug. 25, 2005

(30) Foreign Application Priority Data

Dec. 10, 2003    (KR) ...................... 10-2003-0089367

(51) Int. Cl.
*G02B 15/14* (2006.01)
(52) U.S. Cl. ..................... 359/704; 359/702
(58) Field of Classification Search ........ 359/694–704, 359/819, 822–826; 396/72, 85, 87, 349
See application file for complete search history.

(56) References Cited

U.S. PATENT DOCUMENTS 5,742,850 A * 4/1998 Nomura et al. ............... 396/72
5,971,630 A * 10/1999 Nomura et al. ............. 396/349
6,046,864 A *  4/2000 Onda ......................... 359/819

FOREIGN PATENT DOCUMENTS

| JP | 07-295050 A   | 11/1995 |
| JP | 10-111444 A   |  4/1998 |
| JP | 2001-251454 A |  9/2001 |
| JP | 2003-121720 A |  4/2003 |

* cited by examiner

*Primary Examiner*—Ricky Mack
*Assistant Examiner*—M. Hasan
(74) *Attorney, Agent, or Firm*—Gardner Carton & Douglas LLP (57) ABSTRACT

Provided is a zoom lens barrel including a plurality of lens groups, each having at least one lens arranged in an optical axis direction, an actuating mechanism capable of moving the lens groups in an optical axis direction, and a shutter unit including an opening portion for exposure, a blade capable of adjusting the degree of opening of the opening portion, and an electronic actuating apparatus capable of actuating the blade to adjust the degree of opening of the opening portion according to the distance between the shutter unit and one of the lens groups adjacent to the shutter unit when the distance is shorter than a predetermined distance.

24 Claims, 8 Drawing Sheets

ZOOM LENS BARREL

BACKGROUND OF THE INVENTION

This application claims the priority of Korean Patent Application No. 2003-89367, filed on Dec. 10, 2003, in the Korean Intellectual Property Office, the disclosure of which is incorporated herein in its entirety by reference.

1. Field of the Invention

The present invention relates to a zoom lens barrel for a camera such as a digital camera, and more particularly, to a zoom lens barrel having a total length which is remarkably reduced.

2. Description of the Related Art

In general, a lens barrel used for a camera such as a digital camera, capable of zooming and having an accommodation function, includes a first lens group, a second lens group, and a third lens group arranged in an optical axis direction from an object to be photographed, and an actuating mechanism to move the lens groups in the optical axis direction. The zoom lens barrel further includes a shutter unit having an opening portion for exposure, a blade capable of adjusting a degree of opening of the opening portion, and an electronic drive source to drive the blade. Recently, it is a trend to make a camera such as a digital camera thinner and smaller.

In a conventional film camera, however, since the opening portion needs to be shielded by closing the blade of the shutter unit to prevent film from being exposed to light when the camera is in a zoom state or in an accommodation state, the shutter unit and the lens groups cannot be overlapped. Accordingly, there is a limit in reducing the total length of the lens barrel so that it is difficult to make the camera thinner and smaller.

In the conventional typical digital camera, since the inner diameter of the opening portion of the shutter unit is less than the outer diameter of a lens frame, the shutter unit and the second lens group cannot be overlapped and the shutter unit is fixed by being separated a predetermined distance from the second lens group. In the accommodation state as in the zoom state, the shutter unit needs to maintain a predetermined distance from the second lens group. Thus, there is a limit in making the camera thinner and smaller by reducing the total length of the lens barrel.

Japanese Patent Publication No. 2003-121720 discloses a structure of a lens barrel of a camera in which the shutter unit is fixed to the first lens group. In the lens barrel, since the inner diameter of the opening portion of the shutter unit is less than the lens frame of the second lens group, even if they are overlapped at their maximum, only a very small portion of a leading end of the second lens group overlaps the opening portion of the shutter unit so that there is a limit in reducing the total length of the lens barrel. Furthermore, in the accommodation state as in the zoom state, since the maximum open size of the blade of the shutter unit remains the same, it is difficult to make the shutter unit and the second lens group completely overlapping each other.

SUMMARY OF THE INVENTION

To solve the above and/or other problems, the present invention provides a zoom lens barrel in which a shutter unit is operated in engagement with the movement of lens groups so that the shutter unit and the lens groups are overlapped at their maximum. Thus, the total length of the lens barrel is remarkably reduced so that a camera can be made thinner and smaller.

The present invention provides a zoom lens barrel in which the inner diameter of an opening portion of the shutter unit is larger than the outer diameter of a lens frame of the lens groups so that, in an accommodation state, the lens frame of the lens groups is completely inserted in the opening portion of the shutter unit. Thus, the total length of the lens barrel is remarkably reduced so that a camera can be made thinner and smaller.

According to an aspect of the present invention, a zoom lens barrel comprises a plurality of lens groups, each having at least one lens arranged in an optical axis direction, an actuating mechanism actuating the lens groups capable of moving in the optical axis direction, and a shutter unit including an opening portion for exposure, a blade capable of adjusting a degree of opening of the opening portion, and an electronic actuating apparatus actuating the blade to adjust a degree of opening of the opening portion according to the distance between the shutter unit and one of the lens groups adjacent to the shutter unit when the distance is shorter than a predetermined distance.

During a zoom operation, the blade of the shutter unit is actuated, capable of adjusting a degree of opening of the opening portion to be large or small according to a degree of necessary exposure. During an accommodation operation, the blade of the shutter unit opens the opening portion so that a lens of at least one lens group adjacent to the opening portion lens group is inserted in the opening portion of the shutter unit. The blade of the shutter unit is actuated to open the opening portion larger during an accommodation operation than during a zoom operation. In an accommodation state, a lens of at least one lens group adjacent to the opening portion of the shutter unit is inserted in the opening portion of the shutter unit.

An elastic unit is provided between the shutter unit and a lens frame which arranges the lens of one of the lens groups adjacent to the shutter unit in the optical axis direction. In a zoom state, the elastic unit is in a non-compression state. When a camera is in an operation state, the elastic unit is in a non-compression state. In an accommodation state, while the elastic unit is compressed, the shutter unit is located at a position more towards one of the lens groups adjacent to the shutter unit. When a camera is in a non-operation state, while the elastic unit is compressed, the shutter unit is located at a position more towards one of the lens groups adjacent to the shutter unit.

During a zoom operation, the shutter unit moves toward an object to be photographed in the optical axis direction in engagement with operation of the actuating mechanism, and one of the lens groups adjacent to the shutter unit moves toward the object to be photographed in the optical axis direction in engagement with the movement of the shutter unit.

During an accommodation operation, the shutter unit moves away from an object to be photographed in the optical axis direction in engagement with operation of the actuating mechanism, and one of the lens groups adjacent to the shutter unit moves away from the object to be photographed in the optical axis direction in engagement with the movement of the shutter unit.

According to another aspect of the present invention, a zoom lens barrel comprises a plurality of lens groups including at least a first lens group and a second lens group arranged in order from an object to be photographed, each lens group having at least one lens arranged in an optical axis direction, an actuating mechanism capable of moving the lens groups in the optical axis direction, and a shutter unit including an opening portion for exposure, a blade capable of adjusting a degree of opening of the opening portion, and an electronic actuating apparatus actuating the blade to adjust a degree of opening of the opening portion according to a distance between the shutter unit and the second lens group when the distance is shorter than a predetermined distance.

The shutter unit is interposed between the first lens group and the second lens group. In a non-accommodation state, the blade of the shutter unit is capable of adjusting a size of opening of the opening portion so that a lens of the second lens group is inserted therein. During an accommodation operation, the blade of the shutter unit opens the opening portion so that a lens of the second lens group is inserted therein. The shutter unit is actuated to approach the second lens group as the second lens group is shifted from a non-accommodation state to an accommodation state.

An elastic unit is interposed between the shutter unit and a second lens frame which maintains a lens of the second lens group to be arranged in the optical axis direction. In a non-accommodation state, the elastic unit is in a non-compression state. In an accommodation state, as the elastic unit is compressed, the shutter unit is located at a position moved toward the second lens group.

During a zoom operation, the shutter unit moves toward the object to be photographed in the optical axis direction in engagement with operation of the actuating mechanism, and the second lens group moves toward the object to be photographed in the optical axis direction in engagement with the movement of the shutter unit.

During an accommodation operation, the shutter unit moves away from the object to be photographed in the optical axis direction in engagement with operation of the actuating mechanism, and the second lens group moves away from the object to be photographed in the optical axis direction in engagement with the movement of the shutter unit.

According to another aspect of the present invention, a zoom lens barrel comprises a plurality of lens groups including at least a first lens group and a second lens group arranged in order from an object to be photographed, each lens group having at least one lens arranged in an optical axis direction, an actuating mechanism actuating the lens groups capable of moving in the optical axis direction, and a shutter unit including an opening portion for exposure, a blade capable of adjusting a degree of opening of the opening portion, and an electronic actuating apparatus actuating the blade, and actuating the blade, and in an accommodation state, overlapping the second lens group so that a lens of the second lens group is inserted in the opening portion. The shutter unit is interposed between the first lens group and the second lens group.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
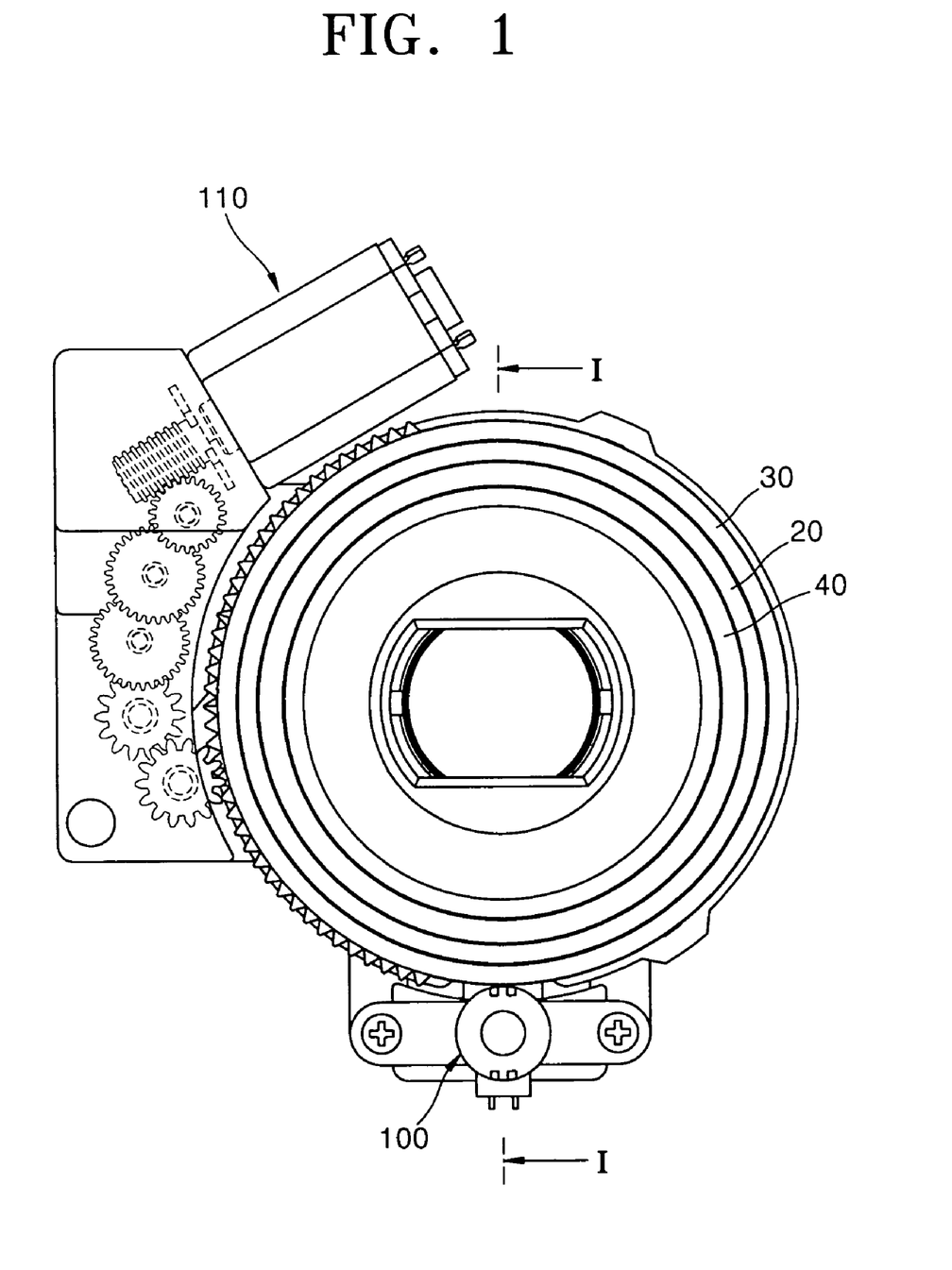
FIG. 1 is a front view illustrating a lens barrel according to an embodiment of the present invention.
Figure 2:
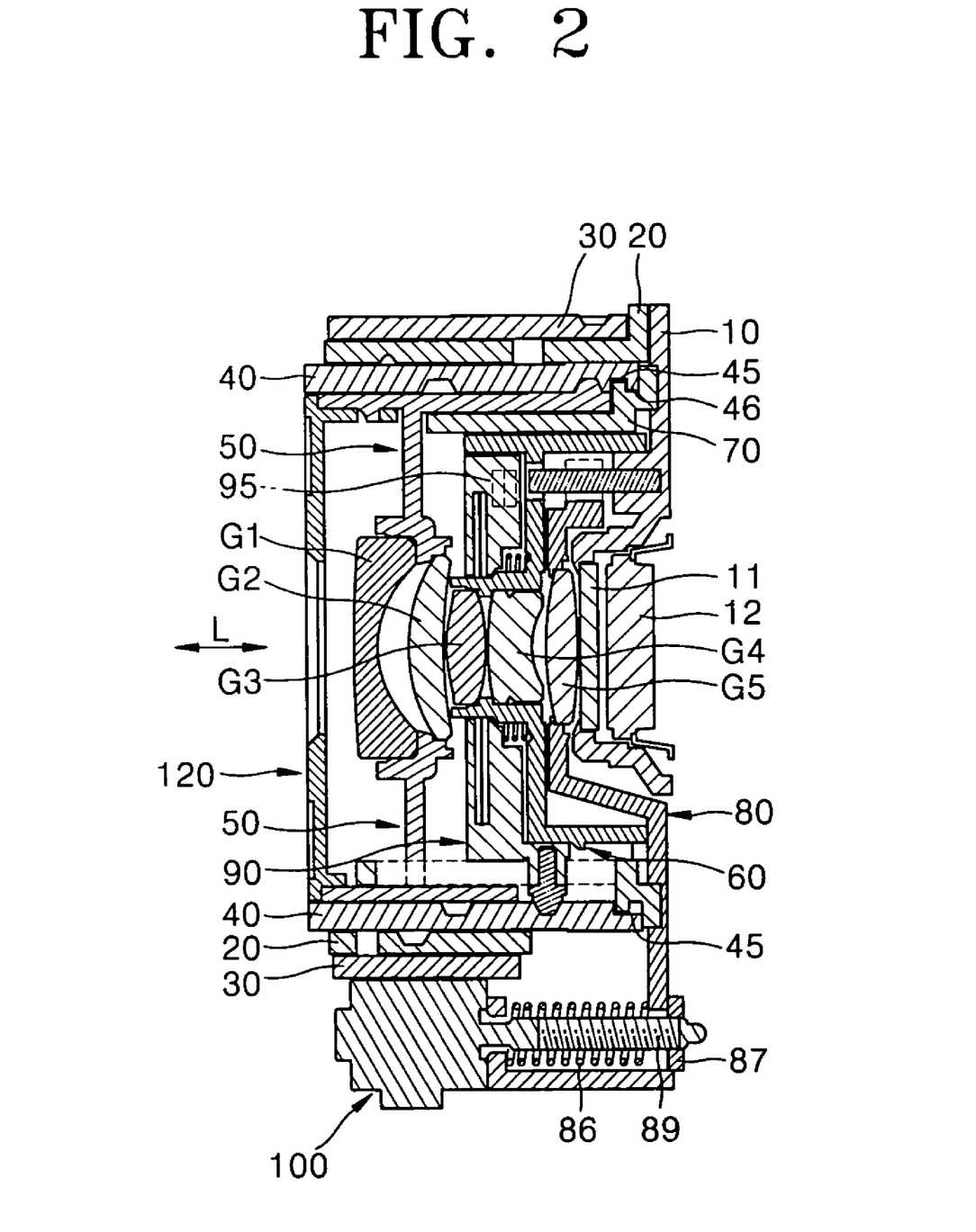
FIG. 2 is a sectional view taken along line I—I of FIG. 1 which shows the lens barrel when the lens groups are in an accommodation state.

FIGS. 1 through 5 show a lens barrel according to an embodiment of the present invention. As shown in FIGS. 1 and 2, the lens barrel according to the present embodiment includes a filter 11 and an imaging device 12 arranged in order from an object to be photographed along an optical axis in an optical axis direction L, a base 10 fixed to a main body (not shown) of a camera on which a charge coupled device (CCD), for example, is installed, a fixed barrel 20 fixed to the base 10, an outer guide frame 30 coupled to an outer surface of the fixed barrel 20 and capable of rotating around the optical axis and along an outside surface of the fixed barrel 20, a cam barrel 40 coupled to an inner surface of the fixed barrel 20 and capable of linearly moving while rotating around the optical axis along an inner surface of the fixed barrel 20, an inner guide frame 70 coupled to an inner surface of the can barrel 40 and capable of linearly moving along the optical axis while rotating around the optical axis with respect to the cam barrel 40 along an inner surface of the cam barrel 40, a first lens group 50 disposed between the inner surface of the cam barrel 40 and the outer surface of the inner guide frame 70 and capable of moving in the optical axis direction, a shutter unit 90 actuated in engagement with the cam barrel 40 moving in the optical axis direction, a second lens group 60 disposed inside the inner guide frame 70 and capable of moving in the optical axis direction in engagement with-the actuation of the shutter unit 90, and a third lens group 80 supported by the base 10 and capable of moving in the optical axis direction.

Figure 3:
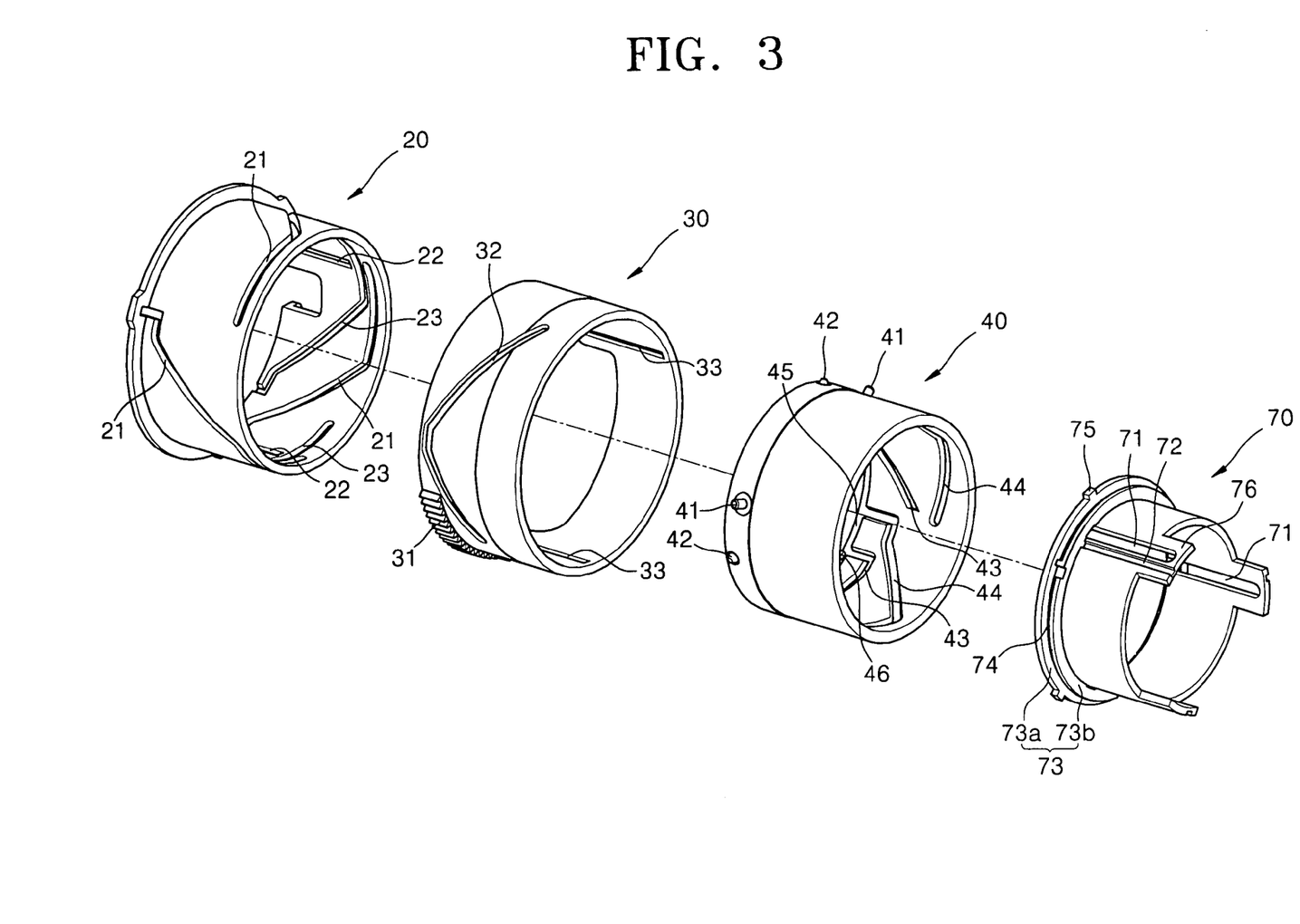
FIGS. 3 through 6 are exploded perspective views illustrating the respective constituent elements.

The fixed barrel 20, as shown in FIG. 3, includes at least one, for example, three, cam barrel guide slot 21 penetrating the fixed barrel 20 to guide rotation and linear movement of the cam barrel 40; at least one, for example, three, inner guide frame guide groove 22 formed in an inner circumferential surface of the fixed barrel 20 to guide a linear motion of the inner guide frame 70; and at least one, for example, three, cam barrel guide groove 23 formed in the inner circumferential surface of the fixed barrel 20 to guide the cam barrel 40 to an accurate position when the cam barrel 40 rotates and linearly moves.

The outer guide frame 30, as shown in FIG. 3, includes a drive gear portion 31 partially formed at an edge of a rear side of an outer circumferential surface thereof, a drive slot 32 penetrating the outer guide frame 30 to drive a finder, and a cam barrel drive groove 33 formed in an inner circumferential surface thereof in the optical axis direction to drive the cam barrel 40.

The cam barrel 40, as shown in FIG. 3, includes at least one, for example, three, cam barrel driving protrusion 41 formed at an edge of a rear side of an outer circumferential surface of the cam barrel 40 in a predetermined interval, for example, a particular interval in a radial direction, and a cam barrel pin 42 formed at the edge of the rear side of the outer circumferential surface of the cam barrel 40 to limit the position of the cam barrel 40 such that the cam barrel 40 is arranged at an accurate position on the optical axis. In an assembled state, the cam barrel driving protrusion 41 passes through the cam barrel guide slot 21 of the fixed barrel 20 and inserted in the cam barrel drive groove 33 of the outer guide frame 30. The cam barrel pin 42 is inserted in the cam barrel guide groove 23. In the assembled state, the cam barrel driving protrusion 41 is moved by receiving a rotation force from the outer guide frame 30 that is rotated by power transferred from an external drive source 110 via the drive gear portion 31. Then, the cam barrel driving protrusion 41 rotates around the optical axis along the cam barrel guide slot 21 of the fixed barrel 20 and simultaneously advances or retreats in the optical axis direction. Accordingly, the cam barrel 40 coupled to the cam barrel driving protrusion 41 rotates around the optical axis and simultaneously advances or retreats in the optical axis direction. At this time, as the cam barrel pin 42 moves along the cam barrel guide groove 23 of the fixed barrel 20, when the cam barrel 40 rotates and moved forward and backward, the motion of the cam barrel 40 is restricted such that the cam barrel 40 can move to an accurate position on the optical axis.

The cam barrel 40 includes a shutter unit guide groove 43 formed in an inner circumferential surface of the cam barrel 40 to guide movement in the optical axis direction and rotation with respect to the optical axis of the shutter unit 90, a first lens group guide groove 44 formed in the inner circumferential surface thereof to guide movement in the optical axis direction and rotation with respect to the optical axis of the first lens group 50, a cam barrel step portion 45 formed along an edge of a rear side of the inner circumferential surface of the cam barrel 40 to guide a relative rotation motion of the inner guide frame 70 with respect to the cam barrel 40 around the optical axis, and a cam barrel step portion protrusion 46 that is at least one protrusion formed at an edge of a rear side of the cam barrel step portion 45 at a particular interval in a radial direction to guide a relative rotation motion of the inner guide frame 70 with respect to the cam barrel 40 with respect to the optical axis.

The inner guide frame 70, as shown in FIG. 3, includes a shutter unit guide slot 71 formed in the optical axis direction by penetrating the inner guide frame 70 to guide a linear motion of the shutter unit 90 in the optical axis direction, a first lens group guide groove 72 formed in an outer circumferential surface of the inner guide frame 70 in the optical axis direction to guide a linear motion of the first lens group 50 in the optical axis direction, an inner guide frame guide groove 74 formed between two flanges 73a and 73b protruding from an edge of a rear side of the outer circumferential surface of the inner guide frame 70 in a radial direction and coupled to the cam barrel step portion protrusion 46, to guide a rotation motion of the inner guide frame 70 around the optical axis, and an inner guide step portion protrusion 75 protruding outwardly in a radial direction from an outer circumferential surface from the flange 73a located at a rear side of the flanges 73a and 73b and inserted in the inner guide frame guide groove 22 of the fixed barrel 20, to guide a linear motion of the inner guide frame 70 in the optical axis direction. Since the flange 73a at the rear side of the two flanges 73a and 73b of the inner guide frame 71 protrudes further than the flange 73b at the front side, in the radial direction of the outer circumferential surface thereof, the inner guide frame 70 is not inserted in the cam barrel 40 and contacts an end portion of the rear side of the cam barrel 40 so as to be coupled to the fixed barrel 20.

Figure 4:
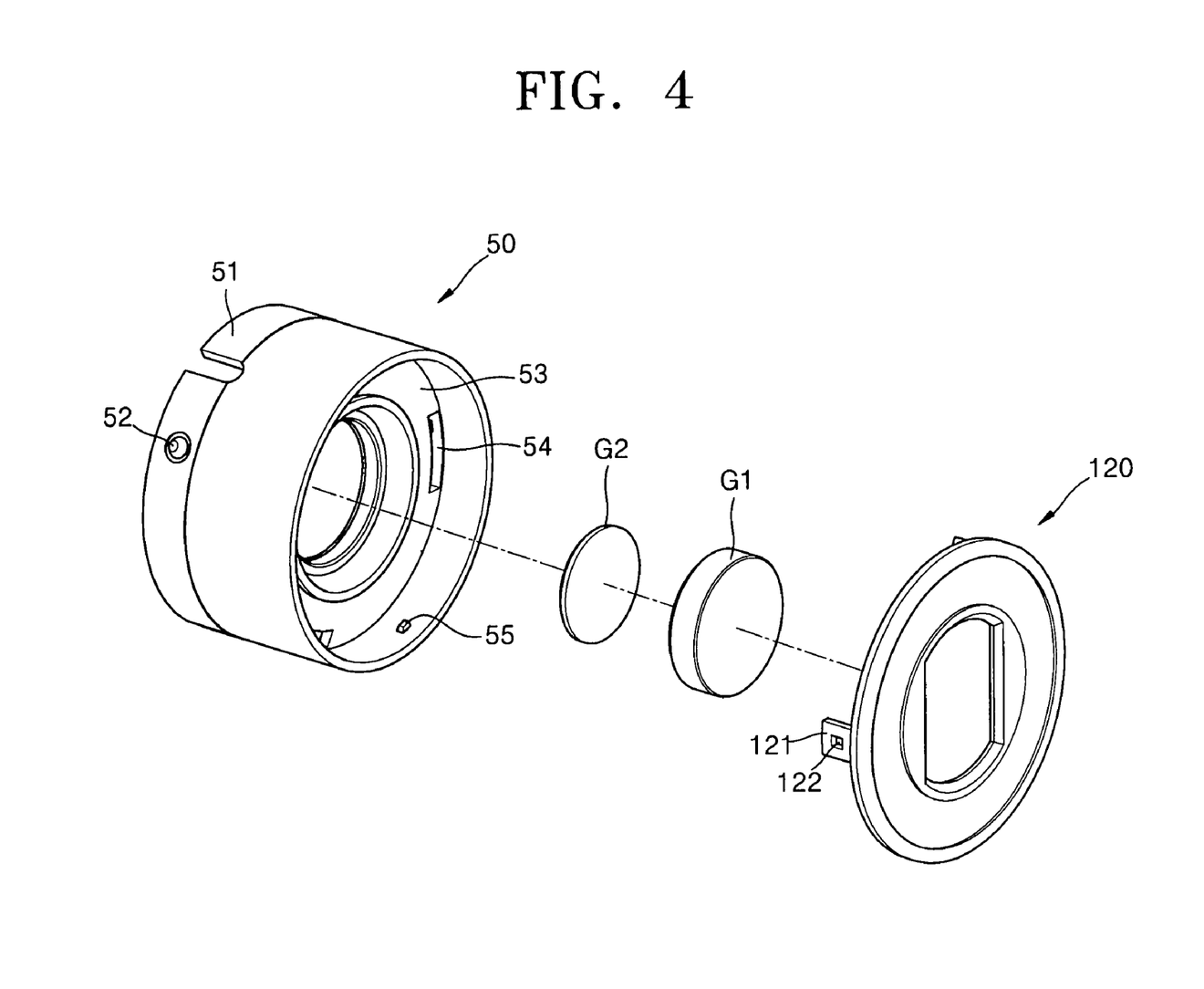

The first lens group 50, as shown in FIG. 4, includes a plurality of lenses consisting of a G1 lens and a G2 lens and a first lens frame 51 which fixes the G1 and G2 lenses, is disposed between the inner circumferential surface of the cam barrel 40 and the outer circumferential surface of the inner guide frame 70, and is capable of moving in the optical axis direction. A first lens group guide pin 52 is formed at an edge of a rear side of an outer circumferential surface of the first lens frame 51 and inserted in the first lens group guide groove 44 so that, during a zoom operation, the first lens group 50 is moved in the optical axis direction in engagement with the movement of the cam barrel 40. An inner guide frame insertion slot 54 is formed at an edge of a lens fixing portion 53 of the first lens frame 51 in which a protruding portion 76 formed by extending the shutter unit guide slot 71 and the first lens group guide groove 72 of the inner guide frame 70 is inserted during an accommodation operation. A front panel 120 is installed in front of the first lens frame 51, as shown in FIG. 4. At least one, for example, three, panel fixing portions 121 to fix the front panel 120 to the first lens frame 51 protrude at an edge of the front panel 120. A panel fixing groove 122 is formed at the panel fixing portion 121. As a panel fixing protrusion. 55 formed at a portion of the edge of a front side of the inner circumferential surface of the first lens frame 51 is inserted in the panel fixing groove 122, the front panel 120 is coupled to the first lens group 50.

Figure 5:
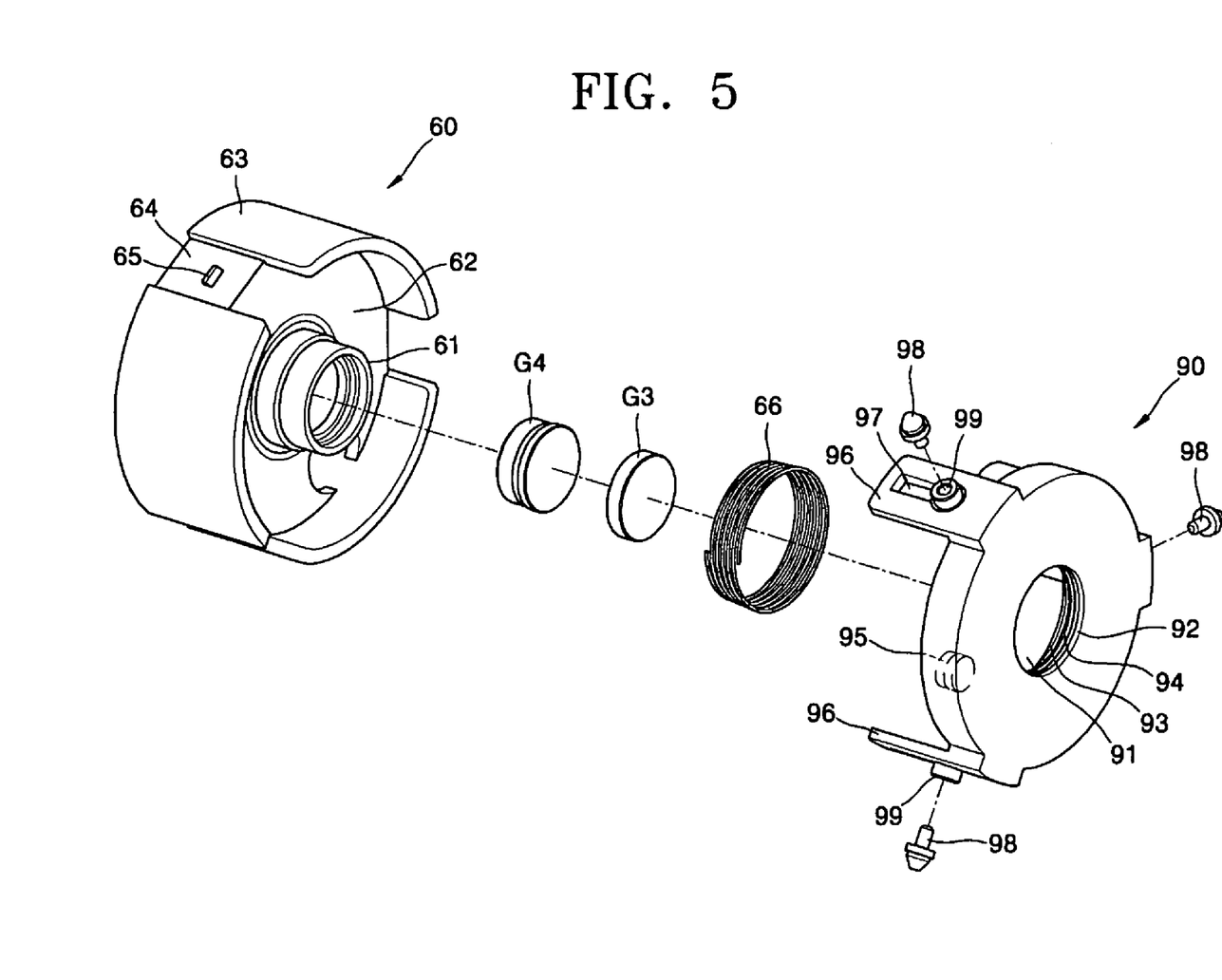

The second lens group 60, as shown in FIG. 5, includes a plurality of lenses consisting of a G3 lens and a G4 lens, a lens fixing portion 61 protruding from a center portion thereof to fix the G3 and G4 lenses, an extension portion 62 extending outwardly in a radial direction from the lens fixing portion 61, and a support portion 63 extending from the extension portion 62 to the front and rear sides of the optical axis direction. The support portion 63, as shown in FIG. 5, includes a shutter unit coupling groove 64 which guides the shutter unit 90 to linearly move in the optical axis direction and is coupled to the shutter unit 90. A shutter unit coupling protrusion 65 that is used when the second lens group 60 is coupled to the shutter unit 90 is formed on the shutter unit coupling groove 64.

The shutter unit 90, as shown in FIG. 5, includes a front cover 92 and a rear cover 93 having an opening portion 91 for exposure at the center thereof, a blade 94 arranged between the front cover 92 and the rear cover 93 to open the opening portion 91, an electronic actuator 95 to actuate the blade 94, and a shutter unit coupling portion 96 extending from edges of the front and rear covers 92 and 93 in the optical axis direction and inserted in the shutter unit coupling groove 64 of the second lens group 60.

The electronic actuator 95 is accommodated in the front and rear covers 92 and 93. During the accommodation operation, as the shutter unit 90 approaches the second lens group 60, the electronic actuator 95 actuates the blade 94 such that the second lens frame 61 of the second lens group 60 is inserted in the opening portion 91 of the shutter unit 90. By doing so, since the opening portion 91 of the shutter unit 90 in the accommodation state is open larger than that in a zoom state, the second lens frame 61 of the second lens group 60 can be inserted therein so that the shutter unit 90 and the second lens group 60 is completely overlapped.

A shutter unit groove 97 and a shutter unit guide pin groove 99 are formed in the shutter unit coupling portion 96. The shutter unit coupling protrusion 65 of the second lens group 60 is inserted in the shutter unit groove 97. By the above structure, during the zoom operation, when the shutter unit 90 moves toward an object in the optical axis direction, the unit coupling protrusion 65 is caught in the shutter unit groove 97 so that the second lens group 60 in engagement with the shutter unit 90 moving forward in the optical axis direction maintains a particular distance from the shutter unit 90 and moves forward in the optical axis direction along the second lens group 60. During the accommodation operation, as the shutter unit 90 moves backward in the optical axis direction, since the shutter unit 90 moves without interference from the shutter unit coupling protrusion 65, it prevents the second lens group 60 from moving in the optical axis direction and simultaneously approaches the second lens group 60 while compressing an elastic unit 66 to be described later. The shutter unit guide pin 98 is coupled to the shutter unit guide pin groove 99. The shutter unit guide pin 98 is formed with the shutter unit coupling portion 96 or in other portion of the shutter unit 90. The shutter unit guide pin 98 penetrates the shutter unit guide slot 71 of the inner guide frame 70, is inserted in the shutter unit guide groove 43 of the cam barrel 40, and moves forward and backward in the optical axis direction in engagement with the cam barrel 40.

As shown in FIGS. 2 and 5, the elastic unit 66, for example, a spring, is interposed between the shutter unit 90 and the second lens group 60. The elastic unit 66 is arranged encompassing the second lens frame 61 so that the second lens frame 61 penetrates the elastic unit 66. In the zooming state, the elastic unit 66 that is not compressed maintains a particular distance between the shutter unit 90 and the second lens group 60. In the accommodation state, the shutter unit 90 moves toward the second lens group 60 while compressing the elastic unit 66, part of the second lens group 60, for example, the second lens frame 61, is inserted in the opening portion 91 of the shutter unit 90 so that the second lens group 60 and the shutter unit 90 are completed overlapped. At this time, as the shutter unit 90 approaches the second lens frame 60, the blade 94 of the shutter unit 90 opens the opening portion 91 larger compared to a case in which the opening portion 91 is open to adjust brightness in the zooming state, so that the second lens frame 60 can be inserted in the opening portion 91 of the shutter unit 90. Such operation is performed by actuating the blade 94 so that the electronic actuator 95 inserts the second lens frame 60 in the opening portion 91 of the shutter unit 90 as the shutter unit 90 approaches the second lens group 60 in engagement of the movement of the cam barrel 40.

In a state in which the shutter unit guide pin 98 penetrates the shutter unit guide slot 71 of the inner guide frame 70 and is inserted in the shutter unit guide groove 43, the shutter unit 90 can approach the second lens group 60 in the accommodation state as the cam barrel 40 is rotated by receiving a rotational force from the outer guide frame 30 that is rotated by the external drive source 110.

Figure 6:
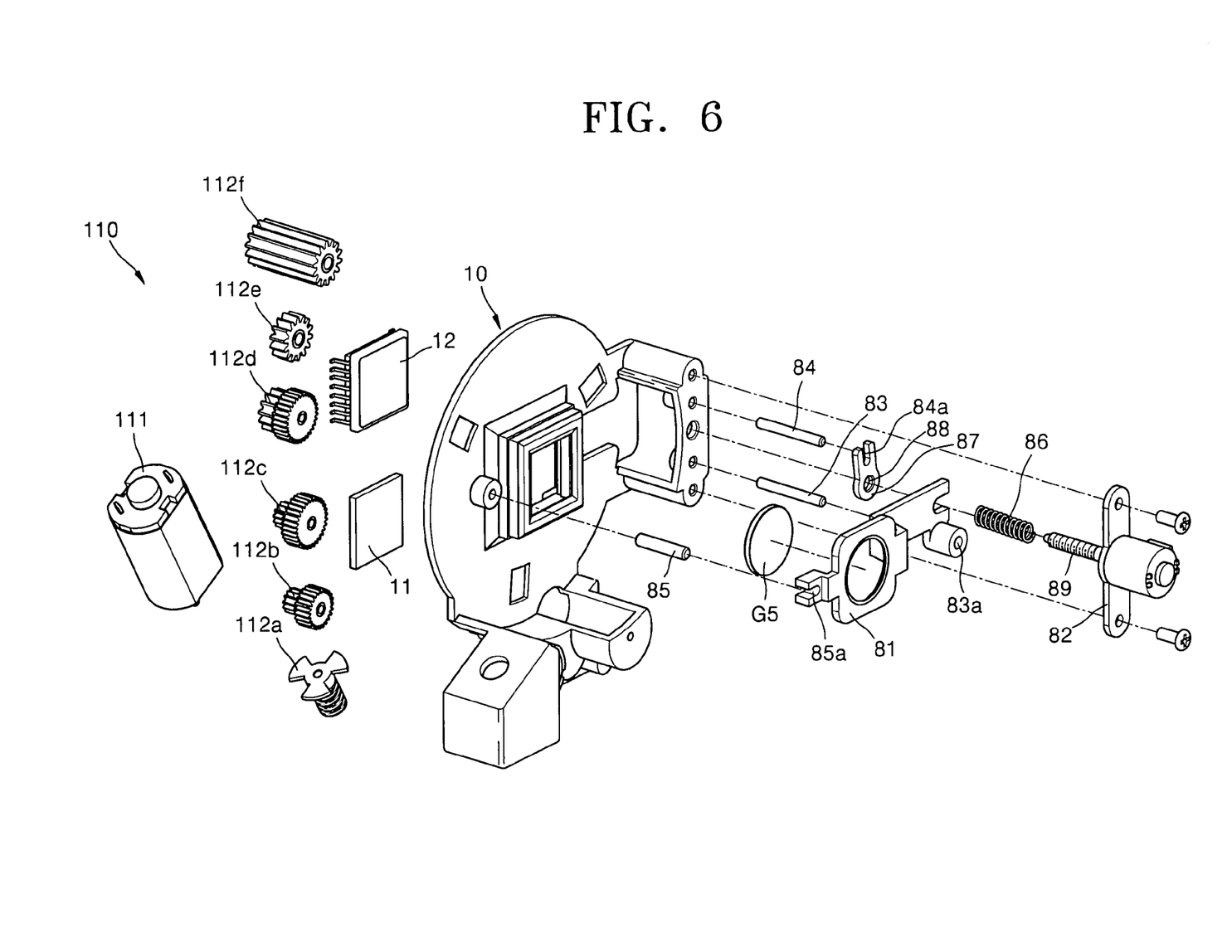

The third lens group 80, as shown in FIG. 6, includes a G5 lens, a third lens frame 81 arranging and fixing the G5 lens in the optical axis direction, a third lens group drive motor 82 moving the third lens frame 81 forward and backward in the optical axis direction, and three guide bars 83, 84, and 85 guiding the movement of the third lens frame in the optical axis direction. Among the three guide bars 83, 84, and 85, one is arranged in the upper portion of the third lens frame 81 and two are arranged in the lower portion thereof, as shown in FIG. 6. The three guide bars 83, 84, and 85 are guided by being inserted in holes 83a and 85a formed in the third lens frame 81 and a hole 84a formed in an additional guide plate 87, respectively. The third lens frame 81 is moved in the optical axis direction as a guide screw portion 89 extending from the third lens group drive motor 82 and passing through a guide screw hole 88 formed in the guide plate 87 rotates along a screw formed in an inner circumferential surface of the guide screw hole 88 by receiving power of the third lens group drive motor 82. A third lens group elastic unit 86 is installed around an outer circumferential surface of the guide screw portion 89 and performs an elastic function between the third lens group drive motor 82 and the third lens frame 81 to make the third lens frame 81 closely contact the guide plate 87. By providing the third lens group elastic unit 86, the driving force of the third lens group drive motor 82 is transferred to the third lens frame 81 via the guide screw portion 89 and the guide screw hole 88 so that the G5 lens moves in the optical axis direction.

The base 10, as shown in FIG. 6, includes an external drive motor 111 forming the external drive source 110 and a series of gears 112a, 112b, 112c, 112d, 112e, and 112f.

Figure 7:
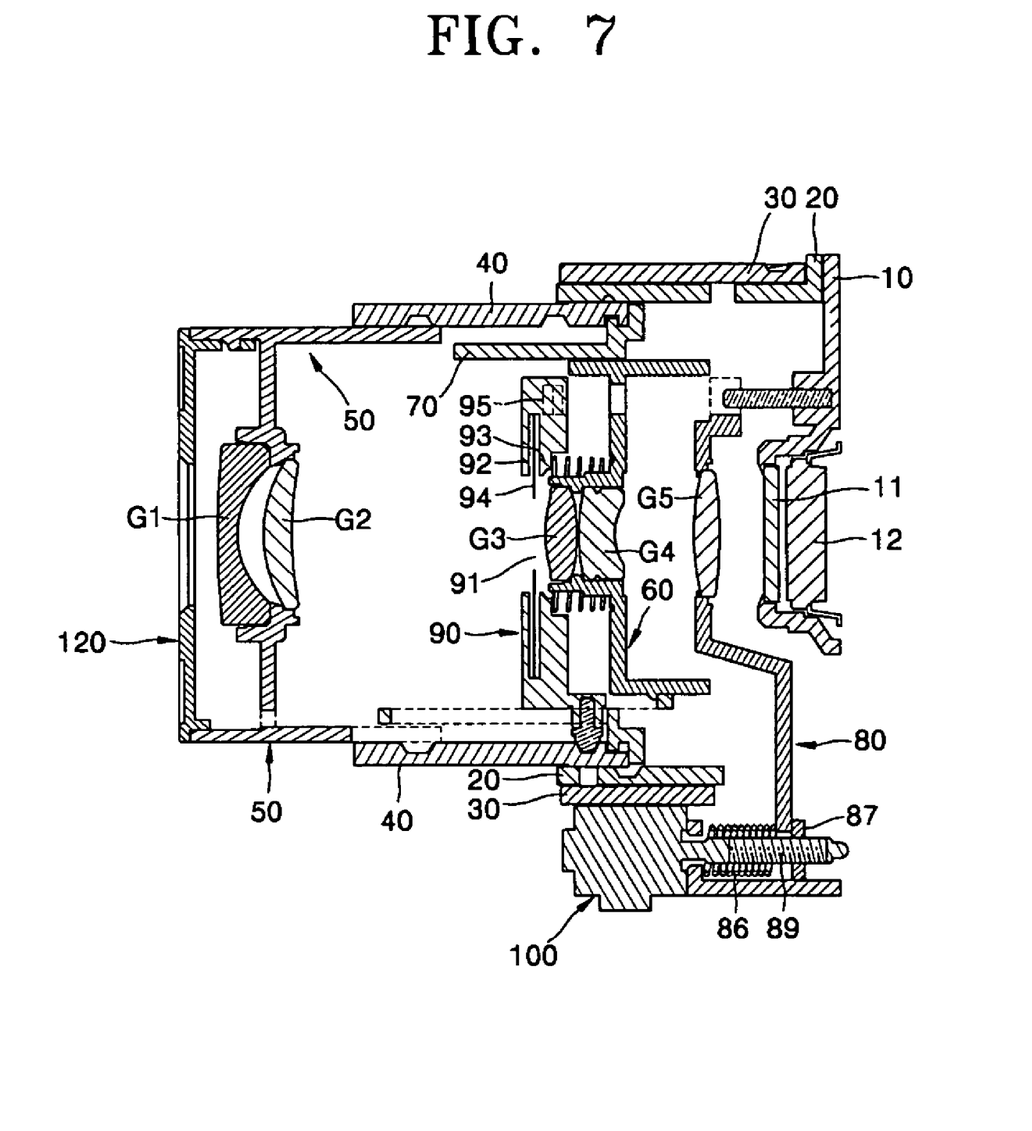
FIG. 7 is a sectional view taken along line I—I of FIG. 1 which shows the lens barrel when the lens groups are arranged at a wide angle photographing position.

The operation of the lens barrel is described with reference to FIGS. 2, 7, and 8. In a state in which the a camera is not in use, as shown in FIG. 2, the first lens group 50, a second lens group 60, and a third lens group 80 retreat to the rearmost position in the optical axis direction. That is, the third lens group 80 is located close to the filter 11 and the second lens group 60 is located close to the third lens group 80. The shutter unit 90 overlaps the second lens group 60 in a state in which the opening portion 91 is open at its maximum so that the second lens frame 61 of the second lens group 60 is inserted in the opening portion 91. The first lens group 50 is located close to the second lens group 60.

When the camera is in use, the external drive source 110 rotates in one direction, the outer guide frame 30 is rotated by the drive gear portion 31. Accordingly, the cam barrel driving protrusion 41 of the cam barrel 40 penetrating the cam barrel guide slot 21 of the fixed barrel 20 and inserted in the cam barrel drive groove 33 of the outer guide frame 30 is moved along the cam barrel drive groove 33 and the cam barrel 40 is moved in the optical axis direction while rotating around the optical axis. The cam barrel 40 can be guided to an accurate position by the cam barrel pin 42 inserted in the cam barrel guide groove 23. As the cam barrel 40 is driven as above, the shutter unit 90 and the first lens group 50 are actuated by the shutter unit guide pin 98 and the first lens group guide pin 52 inserted in the shutter unit guide groove 43 and the first lens group guide groove 44 of the cam barrel 40, respectively. As the shutter unit 90 is actuated, the second lens group 60 is actuated in the optical axis direction by the shutter unit coupling protrusion 65 inserted in the shutter unit groove 97 of the shutter unit 90. Also, the third lens group 80 is moved in the optical axis direction by the driving of the third lens group drive motor 82. Thus, by the above movements, the camera is in a wide angle photographing position.

Figure 8:
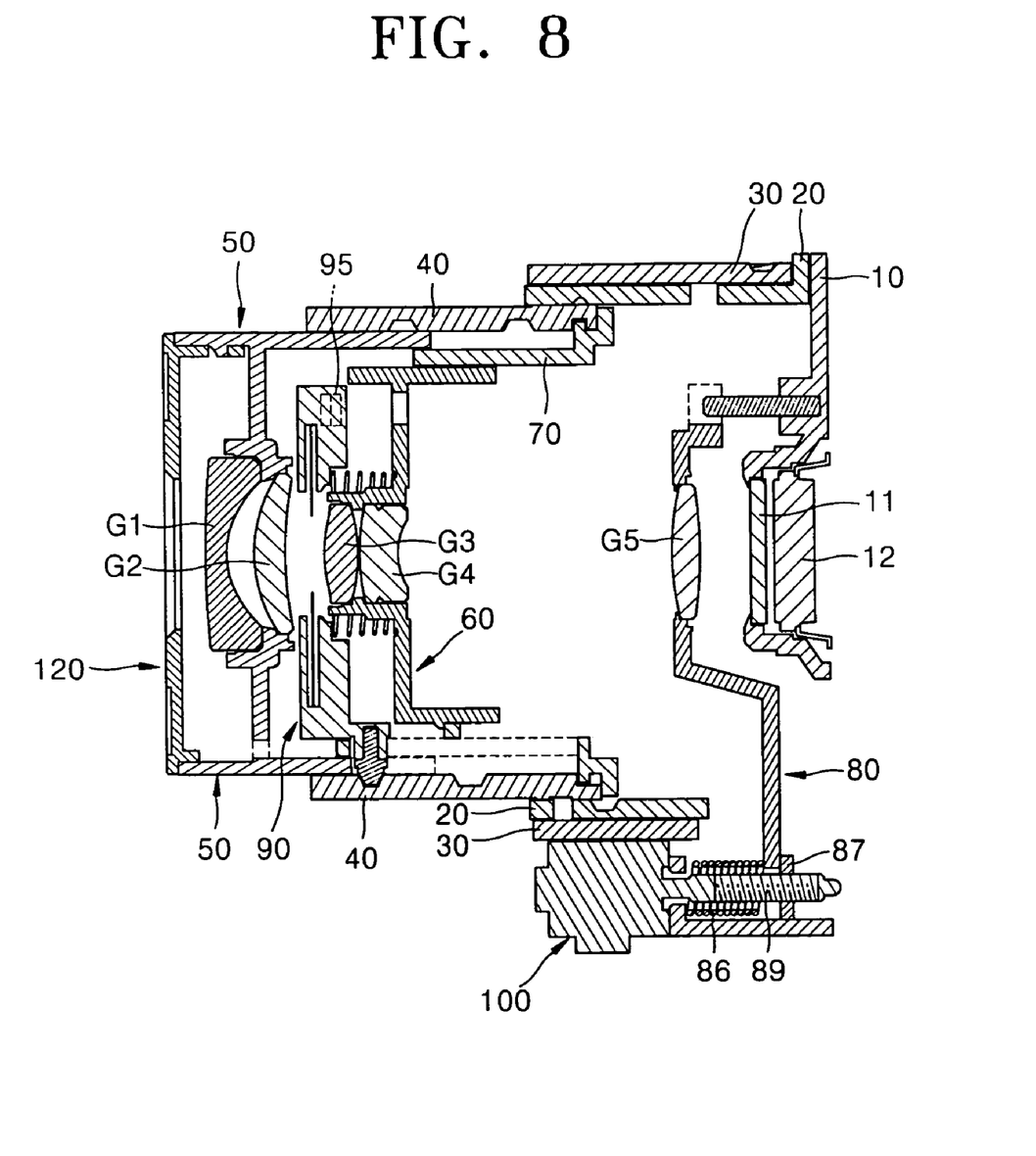
FIG. 8 is a sectional view taken along line I—I of FIG. 1 which shows the lens barrel when the lens groups are arranged at a telescopic photographing position.

When the external drive source 110 further rotates in the wide angle photographing position, as shown in FIG. 8, the outer guide frame 30 further rotates and the cam barrel 40 further rotates. Accordingly, the shutter unit 90 engaged with the driving of the cam barrel 40 rotates around the optical axis and further moves in the optical axis direction. Thus, the second lens group 60 that is moved in the optical axis direction as the shutter unit 90 moves in the optical axis direction further moves in the optical axis direction toward the object to be photographed. Consequently, the camera achieves a telescopic photographing position by the above movements.

When the external drive source 110 rotates in the opposite direction, the outer guide frame 30 and the cam barrel 40 moving in engagement with the outer guide frame 30 are rotated in the opposite direction by the drive gear portion 31. The first lens group 50 and the shutter unit 90 are moved in a reverse path so as to retreat to the initial accommodation state. The shutter unit coupling portion 96 is moved backward by the shutter unit coupling groove 64 of the second lens group 50 without being restricted by the shutter unit coupling protrusion 65 of the second lens group 60 that is caught by the shutter unit groove 97. Accordingly, the shutter unit 90 compresses the elastic unit 66 and approaches the second lens group 60. Furthermore, as the shutter unit 90 operates the blade 94 so that the opening portion 91 can be open larger than in the zoom state, the second lens frame 61 can be inserted in the opening portion 91. The third lens group 80 retreats by the driving of the third lens group drive motor 82 in the opposite direction for accommodation. The third lens group 80 moves toward the object to be photographed in the optical axis direction by the driving of the third lens group drive motor 82 in the opposite direction during the zoom operation.

According to the present embodiment, during the accommodation operation, the shutter unit 90 can approach closer to the second lens group 60 than during the zoom operation. As the shutter unit 90 approaches the second lens group 60, the blade 94 of the shutter unit 90 is operated to allow complete insertion into the opening portion 91 of the shutter unit 90. Thus, the total length of the lens barrel can be remarkably reduced compared to a case in which only a part of a leading end portion of the second lens frame 61 of the second lens group 60 overlaps a part of the opening portion 91 of the conventional shutter unit 90.

Although in the above embodiment the first lens group 50 through the third lens group 80 are described as the plurality of lens groups, the lens barrel according to the present invention is not limited thereto and different numbers of lens groups can be employed.

As described above, the present invention having the above structure has the following effects.

In the lens barrel according to the present invention, during the accommodation operation, the shutter unit approaches closer to an adjacent lens group than that during the zoom operation so that the shutter unit is moved in the optical axis direction in engagement with the adjacent lens group that moves in the optical axis direction. Also, during the accommodation operation, the opening portion is sufficiently open such that at least a part of the adjacent lens group can be completely inserted in the opening portion so that the total length of the lens barrel is remarkably reduced. Thus, the camera can be made thinner and smaller.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A zoom lens barrel comprising:
   a plurality of lens groups, each having at least one lens, arranged in an optical axis direction; and
   a shutter unit including an opening portion for exposure, a blade capable of adjusting a degree of opening of the opening portion, and an electronic actuating apparatus capable of actuating the blade to adjust the degree of opening of the opening portion according to the distance between the shutter unit and one of the lens groups adjacent to the shutter unit.

2. The zoom lens barrel as claimed in claim 1, wherein, during a zoom operation, the blade of the shutter unit is capable of adjusting the degree of opening of the opening portion according to a degree of necessary exposure.

3. The zoom lens barrel as claimed in claim 1, wherein, during an accommodation operation, the blade of the shutter unit opens the opening portion so that at least one lens is inserted in the opening portion of the shutter unit.

4. The zoom lens barrel as claimed in claim 3, wherein the blade of the shutter unit is actuated to open the opening portion larger than during a zoom operation.

5. The zoom lens barrel as claimed in claim 1, wherein, in an accommodation state, a lens is inserted in the opening portion of the shutter unit.

6. The zoom lens barrel as claimed in claim 1, wherein an elastic unit is positioned between the shutter unit and a lens frame that arranges a lens of one of the lens groups adjacent to the shutter unit in an optical axis direction.

7. The zoom lens barrel as claimed in claim 6, wherein, when the zoom lens barrel is in a zoom state, the elastic unit is in a non-compression state.

8. The zoom lens barrel as claimed in claim 6, wherein, when a camera employing the zoom lens barrel is in an operation state, the elastic unit is in a non-compression state.

9. The zoom lens barrel as claimed in claim 6, wherein, as the zoom lens barrel achieves an accommodation state, the shutter unit moves toward one of the lens groups adjacent to the shutter unit as the elastic unit is compressed.

10. The zoom lens barrel as claimed in claim 6, wherein, when a camera employing the zoom lens barrel is in a non-operation state, the elastic unit is compressed and the shutter unit is located at a position relatively towards one of the lens groups adjacent to the shutter unit.

11. The zoom lens barrel as claimed in claim 1, further comprising:
    an actuating mechanism capable of moving the lens groups.

12. The zoom lens barrel as claimed in claim 11, wherein, during a zoom operation, the shutter unit moves toward an object to be photographed, and one of the lens groups adjacent to the shutter unit moves toward the object to be photographed in engagement with the movement of the shutter unit.

13. The zoom lens barrel as claimed in claim 11, wherein, during an accommodation operation, the shutter unit moves away from an object to be photographed in engagement with operation of the actuating mechanism, and one of the lens groups adjacent to the shutter unit moves away from the object to be photographed in engagement with the movement of the shutter unit.

14. A zoom lens barrel comprising:
    a plurality of lens groups including at least a first lens group and a second lens group arranged in order from an object to be photographed, each lens group having at least one lens arranged in an optical axis direction;
    an actuating mechanism capable of moving the lens groups in an optical axis direction; and
    a shutter unit including an opening portion for exposure, a blade capable of adjusting a degree of opening of the opening portion, and an electronic actuating apparatus capable of actuating the blade to adjust the degree of opening of the opening portion according to the distance between the shutter unit and the second lens group.

15. The zoom lens barrel as claimed in claim 14, wherein the shutter unit is interposed between the first lens group and the second lens group.

16. The zoom lens barrel as claimed in claim 14, wherein, in a non-accommodation state, the blade of the shutter unit is capable of adjusting the size of the opening of the opening portion so that a lens of the second lens group may be inserted into the opening.

17. The zoom lens barrel as claimed in claim 14, wherein, during an accommodation operation, the blade of the shutter unit opens the opening portion so that a lens of the second lens group is inserted into the opening portion.

18. The zoom lens barrel as claimed in claim 14, wherein, in an accommodation state, a lens of the second lens group is inserted in the opening portion of the shutter unit.

19. The zoom lens barrel as claimed in claim 14, wherein the shutter unit is actuated to approach the second lens group as the second lens group is shifted from a non-accommodation state to an accommodation state.

20. The zoom lens barrel as claimed in claim 14, wherein an elastic unit is interposed between the shutter unit and a second lens frame which maintains a lens of the second lens group to be arranged in an optical axis direction.

21. The zoom lens barrel as claimed in claim 20, wherein, a non-accommodation state, the elastic unit is in a non-compression state.

22. The zoom lens barrel as claimed in claim 20, wherein, during an accommodation operation, as the elastic unit is compressed, the position of the shutter unit moves toward the second lens group.

23. The zoom lens barrel as claimed in claim 14, wherein, during a zoom operation, the shutter unit moves toward the object to be photographed in engagement with operation of the actuating mechanism, and the second lens group moves toward the object to be photographed in engagement with the movement of the shutter unit.

24. The zoom lens barrel as claimed in claim 14, wherein, during an accommodation operation, the shutter unit moves away from the object to be photographed in engagement with operation of the actuating mechanism, and the second lens group moves away from the object to be photographed in engagement with the movement of the shutter unit.

* * * * *